(No Model.)
D. T. GRAY.
FILTERING APPARATUS FOR PURIFYING PARAFFINE, &c.
No. 281,491. Patented July 17, 1883.
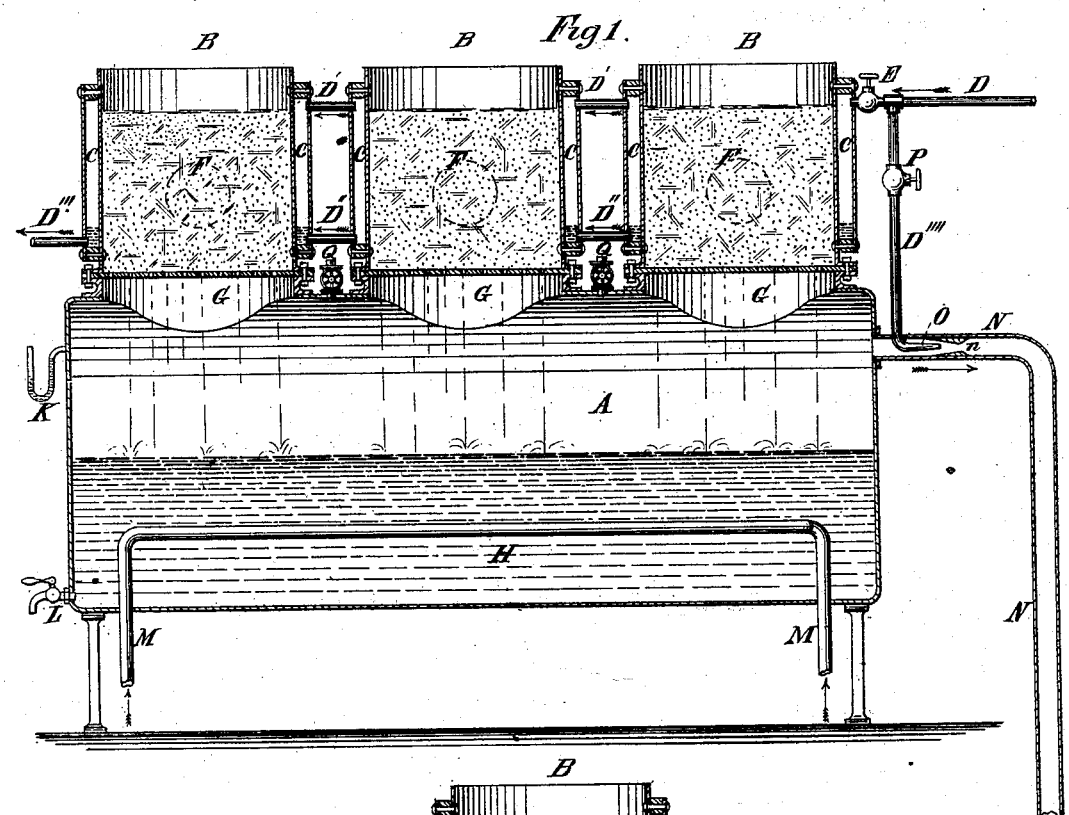
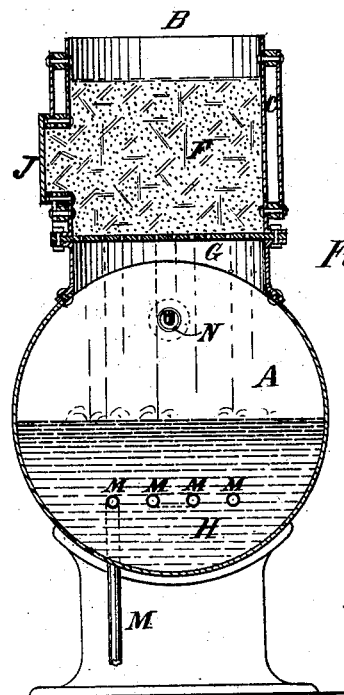
Witnesses:
Henry T. Parker
Jno. E. Gavin
Inventor:
Daniel T. Gray
by Chas. M. Higgins
Attorney

UNITED STATES PATENT OFFICE.

DANIEL T. GRAY, OF JERSEY CITY, NEW JERSEY.

FILTERING APPARATUS FOR PURIFYING PARAFFINE, &c.

SPECIFICATION forming part of Letters Patent No. 281,491, dated July 17, 1883.

Application filed October 9, 1882. (No model.)

*To all whom it may concern:*

Be it known that I, DANIEL T. GRAY, of Jersey City, in the county of Hudson and State of New Jersey, (formerly of Brooklyn, New York,) have invented an Improvement in Filtering Apparatus for Purifying Paraffine, &c., which may also be used as an evaporating apparatus simultaneously with its use as a filtering apparatus; and I do hereby declare that the following is a full, clear, and exact description of the same, reference being had to the accompanying drawings, forming part of this specification.

My invention more particularly relates to apparatus for hot-filtering, and it is especially applicable to filters used in refining and purification of paraffine-wax; but it may also be used for cold-filtering, and it is also applicable to a great variety of chemical industries. By its aid not only filtering may be accomplished, but distillation or concentration of the filtrate may proceed together in one and the same apparatus; or cold-filtration may first be performed, and subsequent concentration or distillation of the filtrate may be effected, if desired.

I will first describe the apparatus as organized, constructed, and used for the refining and purification of paraffine-wax, in which hot-filtering is needed, and will afterward specify modifications in the use of the invention for cold-filtering, evaporation, &c.

Figure 1 in the drawings is a vertical and longitudinal section, and Fig. 2 is a vertical cross-section, of the apparatus, the two views exhibiting all the essential parts of the invention.

A is a tank, which receives the filtrate. The filter-boxes are shown at B. Both the tank and filter-boxes are preferably made of of boiler-iron, and the filter-boxes are flanged onto the tank in the usual manner of constructing such apparatus with boiler-iron, and in such manner that all the joints are practically air-tight. The filter-boxes are provided with jackets C, which are preferably steam-jackets, but which may apply heat to the contents of the filter through the medium of hot water. Steam is conveyed into the jackets C by a pipe, D, provided with a valve, E, for controlling the flow. Circulation of the steam through all the jackets is effected by the short pipes D', and discharge of the water of condensation is effected through the pipes D" and D'''. The filter-boxes B are open to the air at the top, and are, when in use, supplied with bone-black or any other material adapted to the industry for which the apparatus may be applicable, this filling being shown at F in the drawings, supported on the usual perforated bottoms, G, through which the filtered liquid passes, and accumulates in the tank A, as shown at H. Each of the filter-boxes is provided with a man-hole, as shown at J in Fig. 2, through which access may be had to clean out the filters and insert or remove the bone-black or other material. The tank A is provided with a gage, K, preferably a mercury-gage, for indicating the extent to which pressure is reduced in the tank, by means yet to be described. Said tank has also situated in the lower part of the same a cock or valve, L, for discharging its contents. The contents of the tank A and the tank itself are kept hot by a system of steam or hot-water pipes, M, which connect some exterior source of heat with the interior of said tank, and also assist in heating the contents of the filter-boxes by direct conduction of heat from the tank to the boxes. An eduction-pipe, N, leads off any vapor which may be produced by the action of heat upon the contents of the tank A to the open air if a waste product, or to a condenser if a product which it may be desirable to collect and save. Said pipe also affords a passage for the removal of any air that may pass into the tank through the filter-boxes B. At some convenient and suitable point in the pipe N is formed or placed an inspirator, O, connected with the pipe D by the pipe D'''', the latter being provided with a throttle-valve, P. The inspirator injects live steam into the pipe N, the nozzle of the inspirator being placed in the proper relation with a contracted part, *n*, of the pipe N to effect a certain degree of exhaustion in the tank A and produce a partial vacuum therein.

The operation of refining crude paraffine wax requires its solution in naphtha, which solution must be hot-filtered through bone-black, and the naphtha must afterward be distilled or evaporated from the wax. With my invention the filtration and distillation or evaporation proceed together. The solution is placed in the filter-boxes B, through which it flows into the tank A, and the heat introduced by the pipes M evaporates the naphtha, the exhaustion effected by the inspirator O causing external atmospheric pressure to hasten the filtration, and at the same time greatly lowering the boiling-point of the naphtha and rendering its separation from the wax rapid and easy.

The above recital of the process of filtering and evaporating a solution of paraffine-wax in naphtha is typical of the method employed for hot-filtering and concentrating or distilling any liquid whatever.

If it is desired to hot-filter any liquid without evaporating it to any notable extent, the heat may be maintained in the jackets C, and the steam or hot water cut off from the pipes M. Cold-filtering may also be rapidly accomplished by shutting off heat from both the jackets C and pipes M and allowing the inspirator to continue its operation.

Relief or air valves Q, placed at any convenient position in the upper part of the tank A, enable the amount of vacuum in the tank to be regulated by admitting some air without disturbing the inspirator-valve P after the latter has been properly adjusted to secure maximum efficiency.

It will be seen that the apparatus affords facilities for conducting the operations of filtration, evaporation, or distillation, and permits either hot or cold filtration in accordance with the nature of the liquid operated upon. It also possesses the great advantage that the operations of filtration and evaporation may proceed together, the filtration at one temperature and the evaporation at another, or both at the temperature at which the liquid boils in the partial vacuum produced by the inspirator, thus securing not only economy of time, but also an economy of fuel, since the liquid already heated in the process of filtration is at once and continuously, without loss of heat by standing, passed onto the operation of evaporation, concentration, or distillation in the tank.

What I claim as my invention is as follows:

1. The combination, with one or more filter-boxes constructed to admit air at the top, and a receiving-tank for the filtrate, of a pipe or passage for the removal of air and vapor from the tank, and an educting steam-jet connected with said pipe or passage and discharging outwardly therein, whereby a partial vacuum may be maintained in the receiving-tank, substantially as described.

2. The combination, with one or more filter-boxes, a receiving-tank in which a partial vacuum may be maintained, and an appliance for producing such partial vacuum, of a system of steam or hot-water pipes or heaters arranged to heat said tank or its contents, whereby evaporation of a filtrate may be effected simultaneously with and continuously during the filtering process, substantially as and for the purpose set forth.

3. The combination, with one or more filter-boxes provided with steam or hot-water jackets, of a receiving-tank connected with such filter-boxes, and having interior steam or hot-water pipes for assisting in heating the contents of the filter-boxes, substantially as and for the purpose specified.

4. The combination of one or more filter-boxes open to the air at the top, a receiving-tank tightly connected with said filter box or boxes for collecting the filtrate, an eduction pipe or passage for removing air and vapor from said tank, a steam-inspirator connected with said eduction pipe or passage for producing a partial vacuum in said pipe, and air valves or cocks Q, for regulating the reduction of pressure in the tank, substantially as and for the purpose described.

5. A combined filtering and evaporating apparatus consisting of one or more filters open to air at the top, a receiving-tank tightly connected with the bottom of the filter box or boxes, a discharge-pipe for removing air and vapor from the filtrate-tank, and inspirator connected with said discharge-pipe for producing a partial vacuum in said tank, and valves, pipes, and cocks for regulating the action of the apparatus discharging its contents, &c., substantially as herein described, and for the purpose specified.

DANIEL T. GRAY.

Witnesses:
JNO. E. GAVIN,
CHAS. M. HIGGINS.